(12) United States Patent
Fitzgibbon

(10) Patent No.: US 7,262,572 B2
(45) Date of Patent: Aug. 28, 2007

(54) SYSTEM AND METHOD FOR PROVIDING A MACRO FOR A BARRIER OPERATOR

(75) Inventor: James J. Fitzgibbon, Batavia, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 282 days.

(21) Appl. No.: 11/135,981

(22) Filed: May 24, 2005

(65) Prior Publication Data

US 2006/0271212 A1   Nov. 30, 2006

(51) Int. Cl.
*H02P 7/00* (2006.01)
(52) U.S. Cl. .................. 318/466; 318/445; 701/11; 49/26; 49/28
(58) Field of Classification Search ............... 318/466, 318/445; 700/11; 49/26, 28
See application file for complete search history.

(56) References Cited

U.S. PATENT DOCUMENTS

| | | | |
|---|---|---|---|
| 5,889,669 A * | 3/1999 | Kagami et al. ............... 700/17 |
| 6,326,754 B1 * | 12/2001 | Mullet et al. ............... 318/480 |
| 6,512,888 B2 * | 1/2003 | Aoyama ..................... 396/121 |
| 7,190,266 B2 * | 3/2007 | Mullet et al. ............... 340/540 |
| 7,205,892 B2 * | 4/2007 | Luebke et al. ......... 340/539.26 |
| 2002/0038155 A1 * | 3/2002 | Takada et al. ................ 700/11 |

\* cited by examiner

*Primary Examiner*—Rita Leykin
(74) *Attorney, Agent, or Firm*—Fitch, Even, Tabin & Flannery

(57) ABSTRACT

A recording of a macro is initiated. A first of a plurality of actions performable by the moveable barrier operator is selected and the first action is associated with the macro. At least a second of the plurality of actions available is selected at the moveable barrier operator and the second action is associated with the macro. A functional sequence of the first and second actions is recorded. The functional sequence specifies the order of performance of the first and second action. The recording of the macro is terminated. Subsequent to the terminating, actions recorded by the macro are performed at the moveable barrier operator in accordance with the functional sequence.

33 Claims, 3 Drawing Sheets

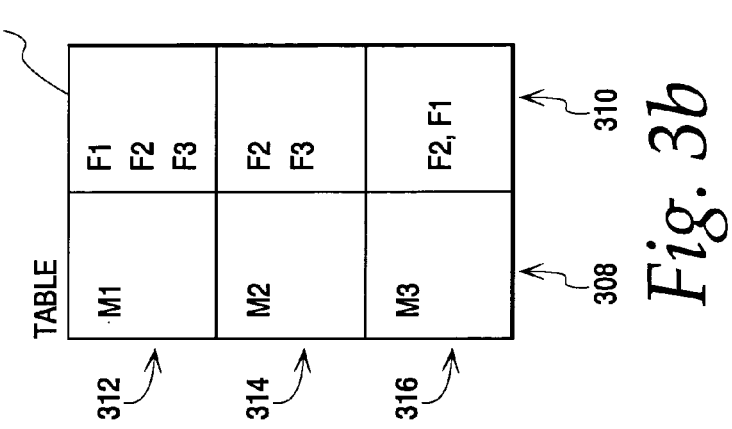
Fig. 3b
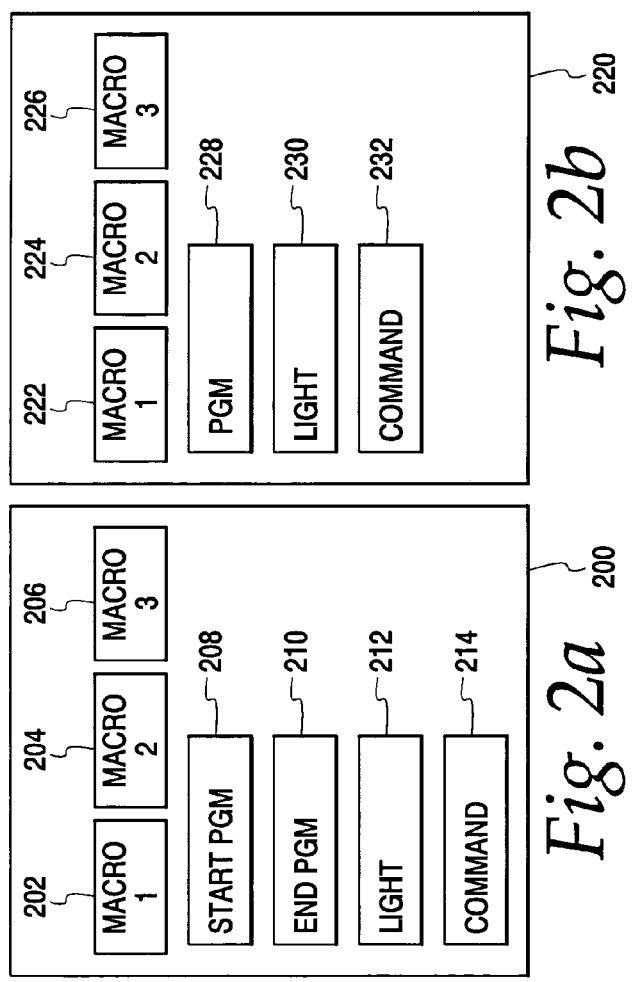
Fig. 2b
Fig. 2a
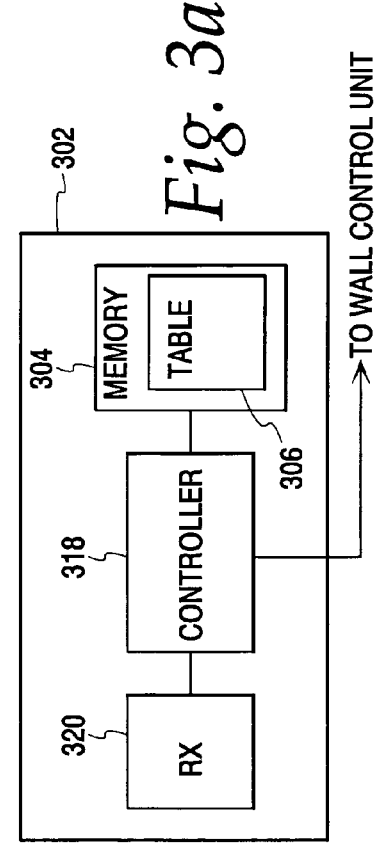
Fig. 3a

SYSTEM AND METHOD FOR PROVIDING A MACRO FOR A BARRIER OPERATOR

FIELD OF THE INVENTION

The field of the invention relates to moveable barrier operators and, more specifically, to programming functions to be used at moveable barrier operators.

BACKGROUND

Different types of moveable barrier operators have been sold over the years and these systems have been used to actuate various types of moveable barriers. For example, garage door operators have been used to move garage doors and gate operators have been used to open and close gates.

Such barrier movement operators may include a wall control unit, which is connected to send signals to a head unit thereby causing the head unit to open and close the barrier. In addition, these operators often include a receiver unit at the head unit to receive wireless transmissions from a hand-held code transmitter or from a keypad transmitter, which may be affixed to the outside of the area closed by the barrier or other structure.

In addition, various functions are performed at moveable barrier operators. For example, users may desire that the door be opened and a light be activated. In another example, the user may desire that a delay period occur before the door opens so that the user can enter their vehicle. In still another example, the door may be opened and a light activated and, after a delay period, the light may be turned off.

Previous systems provided individual commands that operated features of the system by actuating a single switch or some other kind of actuation device. For example, a button was often provided to open the door and another button provided to turn on the light. Unfortunately, in these systems, the user was forced to use the function buttons that were provided or preconfigured with the operator and could not change the functions associated with these buttons or create new functions. In addition, previous systems suffered from the limitation that a single new operation could not be created that combined existing functions. As a result of these problems, user frustration with previous systems occurred since the functions provided with the system could not be changed and/or combined to suit a particular user's requirements.

SUMMARY

A system and method is provided that allows a user to select a series of functions to be performed and associates these functions with a macro. The macro can be actuated at a later time with a single actuator and the functions associated with the macro can then be performed. These approaches are simple and cost-effective to implement and provide a user with the flexibility to create new macros of functions sequences that are tailored to their particular requirements or operating environment.

In accordance with the principles described herein, a recording of a macro is initiated. A first action of a plurality of available actions may be performed by a moveable barrier operator and this action is associated with the macro. At least a second of the plurality of actions available at the moveable barrier operator is then selected and the second action is also associated with the macro. A functional sequence specifying the order of performance of the first and second actions is also recorded. The recording of the macro is then terminated.

Subsequent to the terminating, the actions associated with the macro may be performed at the moveable barrier operator in accordance with the functional sequence.

Advantageously, the operator may select actions including a command that actuates a moveable barrier, a delay time, a light activation control command, and a mode change command. Other examples of actions are possible.

In another advantage, the actions may be dependent in the present condition of the barrier. This allows a person programming the macro to create functions that only occur when the barrier is in its original state.

Using the above mentioned actions, various macros of function sequences can be developed. In one example of a macro, the first action may include selecting a delay time and the second action may include selecting a barrier operational command to operate a moveable barrier. In another macro example, the first action may include selecting a delay time and the second action may include selecting a barrier operational command to operate a moveable barrier and at least one mode change indication. The mode change indication may include selecting a vacation mode toggle indication. In still another example, the first action may include selecting a delay time and the second action may include selecting a barrier operational command to operate a moveable barrier and a sensor reading. The sensor reading may indicate the detection of an object as the object approaches a sensor positioned near the barrier. In yet another example, the first action may include opening the door, the second action may be turning on the light, the third action may be waiting for a delay time, and the fourth action may be turning off the light. It can be seen that any number of actions can be used in a macro and these actions can be arranged in any sequence.

Furthermore, a present state of the operator may be recorded and the operator may be returned to the state whenever the macro is executed. For instance, the present state may be a barrier closed state and whenever the macro is called, the operator may return the barrier to the closed state.

Thus, a system and method is provided that allows a user to customize the functions that are provided at a moveable barrier operator. The approaches described herein are simple and cost effective to implement and expand the number of functions that can be performed at the operator. User satisfaction with the system is enhanced since the approaches described herein allow the user to tailor the functions of the operator to the lifestyle and requirements of individual users.

BRIEF DESCRIPTION OF THE DRAWINGS

FIGS. 2a and 2b are block diagrams of wall control units allowing for the programming of macros in a moveable barrier operator according to the present invention;

FIG. 3a is a block diagram of a moveable barrier operator that can be programmed to program and execute macros according to the present invention;

FIG. 3b is a block diagram of a table stored in a memory unit of the operator of FIG. 3a according to the present invention;

Skilled artisans will appreciate that elements in the figures are illustrated for ease of understanding and have not necessarily been drawn to scale. For example, the dimensions of some of the elements in the figures may be exaggerated relative to other elements to help to improve understanding of various embodiments of the present invention. Also, common but well-understood elements that are useful in a commercially feasible embodiment are often not depicted in order to facilitate a less obstructed view of the various embodiments of the present invention.

DESCRIPTION

Figure 1:
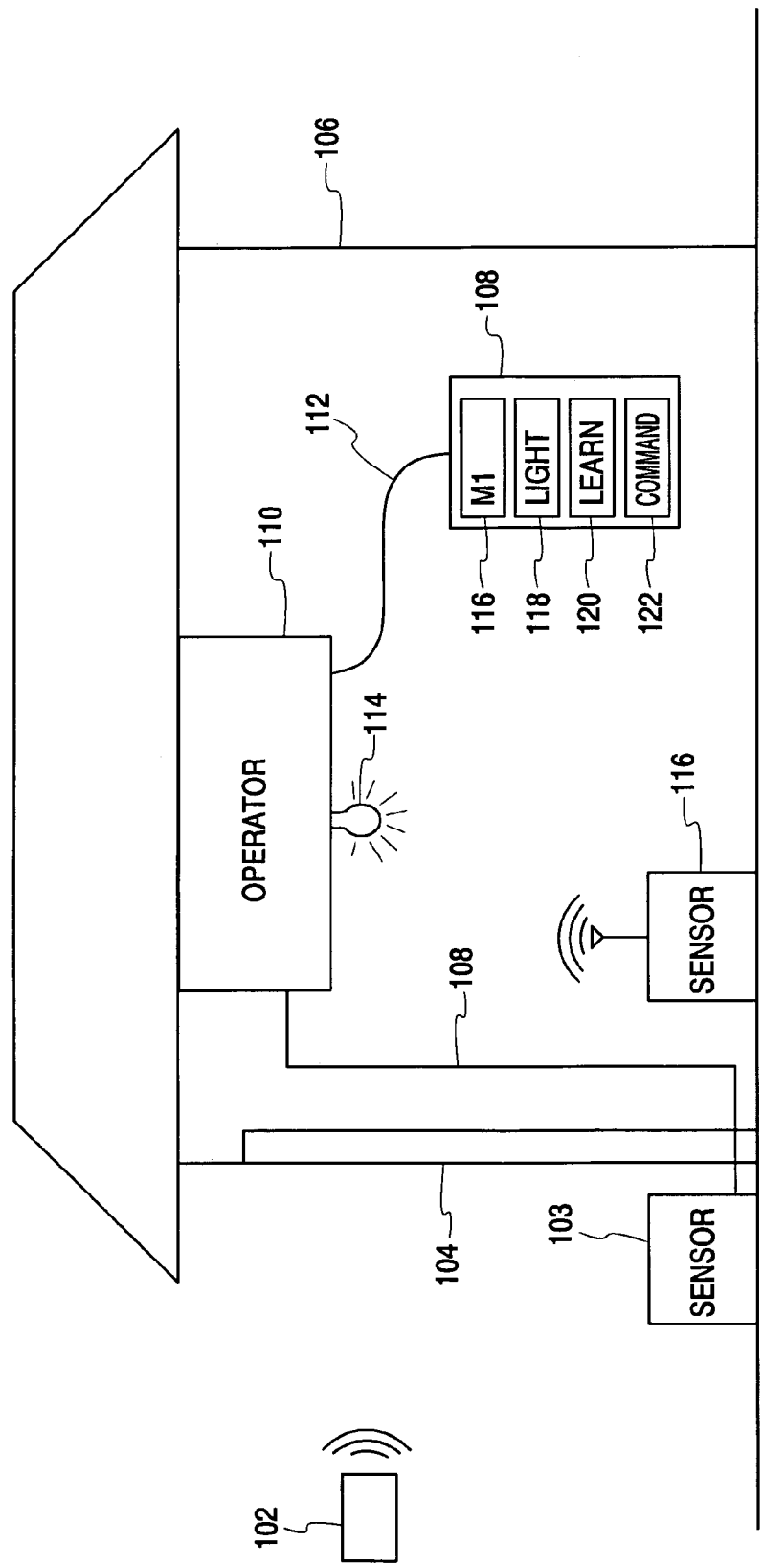
FIG. 1 is a block diagram of a system that allows the programming of macros in a moveable barrier operator according to the present invention.

Referring now to the drawings and especially FIG. 1, a system and method for programming and executing macros in a moveable barrier operator system is described. A transmitter 102 is used to actuate a moveable barrier operator 110, which, in the present example is a garage door opener. The operator 110 is used to move a barrier 104, which, in this case, is a garage door. The operator 110 is situated in a garage 106 and includes a light 114 to allow a user to see in minimal light conditions. Although the barrier 104 is described herein as being a garage door, it will be understood that the barrier 104 can be any type of moveable barrier such as a gate, swinging door, sliding door or shutters. In addition, although the operator 110 is described as being a garage door opener, it will be understood that the operator 110 may be any type of moveable barrier operator such as a gate operator or a swinging door opener. Other examples of barriers and barrier operators are possible.

A wall unit 108 is coupled to the operator 110 via a cable 112. The wall unit 108 includes switches (that allow a user to input information into the system) including a macro switch 116, a light switch 118, a light switch 120, and a command switch 122. The macro switch is used to program macros into the operator as described elsewhere in this specification. The light switch 118 is used to activate and deactivate a light 114, which is attached to the operator 110.

Other devices may also be coupled to the operator 110. In one example a motion-detecting passive infrared (PIR) sensor 103 is used to detect motion in front of the door 104. The detection of motion indicating the presence, for instance, of a vehicle, may be used by the operator 110 to make actuation decisions regarding the door 104.

Users may program function sequences into the wall control unit 108 and these function sequences are associated with a macro. For example, the user may program a macro that executes a command to open the door, waits for a predetermined delay period, and then executes a close command to close the door once the delay period has expired. In another example, a macro could be programmed to wait for a delay period and after the delay expires, the garage door could be opened with a command. In still another example, a macro could be created that first opens or closes the door, waits for a delay period, and, after the delay expires, turns off the light at a period different than the original time setting. In yet another example, a macro can be formed to open the door, flash the light on and off, and the close the door. In another example, a macro can be programmed to detect a user with the detector, wait for a delay period after the detection, turn on the light, wait for another delay period, and then open the door. Other examples of macros are possible. Furthermore, it will be appreciated that any number of actions can be associated with a macro and these actions may be performed in any sequence.

The wall control unit 108 may be structured in various ways to facilitate macro programming. In the example of FIG. 1, the macro switch 116 is pushed and held for a certain period of time to begin programming the macro. Then, the operator records the sequence of events that comprise the macro. For example, the user may turn on the light, open or close the door, or wait for a delay period. After programming the macro is complete and the operator has associated the events with the macro, the user again depresses the macro switch 116 and holds it for a certain period of time to signal to the operator that the macro is complete. In this example, the macro switch 116 is held for a minimum amount of time so that the system can distinguish between attempts to program a macro and execute a macro. Subsequently, when the macro switch 116 is pressed, the macro is automatically executed by the operator.

Alternatively, two dedicated switches or buttons (one for initiating and the other for terminating the macro) can be used on the wall control unit 108 during macro programming. In still another example, a key pad may be used to initiate the programming of the macro. In yet another example, the macro function can be mapped to the transmitter 102. For instance, different buttons or combinations of buttons may be used on the transmitter 102 to program the macro (such as all or some of the buttons on a wall control unit). Other examples of devices and approaches may be used to program the macro at the operator.

The present state of the operator 110 may also be recorded and used. For example, the present state of the operator (e.g., door open) may be recorded. When a macro function is called, the operator may return to the recorded state. In another example, a change in present state may be used to initiate the macro. For instance, the original state of the operator may be "radio signal not detected" and this may change to "unknown radio signal detected" at a later time. In this case, the initiation of macro may be mapped to the activation of the transmitter (that causes the state of the operator to change).

The present state may be a barrier stopped state, a barrier open state, a barrier partially open state, a light-on state, a light-off state, an obstruction-detection state, an obstruction non-detection state, a person detected state, a person non-detection state, a known-radio-signal detection state, a known radio detection non-detection state, an unknown radio signal detection state, or a radio signal non-detection state. Other examples of states are possible.

In addition to directly programming the macro, macros can be preprogrammed and downloaded to an operator. For example, a pre-programmed macro (comprising a sequence of preprogrammed functions) may be programmed at an outside programming source and then downloaded into a memory at an operator. Specifically, macros may be downloaded directly from a computer or placed on some storage media before being downloaded to the operator.

Referring now to FIG. 2a, one example of a wall control unit 200 is described. The wall control unit includes a start programming button 208 and an end programming button 208. The unit 200 also includes three macro buttons 202, 204, and 206. The user presses the start programming button 208 and the macro button 202 to program a first macro into the system. Alternatively, the macro button 202 and the start programming button 208 may be pressed simultaneously. Then, the user may execute the steps of the macro and these are recorded by the operator. For example, the user may execute an open the door command with the command button 214 and control the light with the light button 212.

Once the programming of the macro has been completed, the user presses the end programming button 210. This signifies that the programming of the macro is complete. Then, the macro associated with the pressing of the macro button 202 is stored in a memory of the operator. At a later time, when the macro button 202 is pressed, the macro is executed. Using the macro of the preceding example, the user presses the button 202 and the door opens and the light is activated.

Referring now to FIG. 2b, another example of a wall control unit 220 is described. The wall control unit 220 includes a programming button 228 to begin the programming of a macro. After the programming button is pushed, then the macro button 222 button may also be pressed to signify that the steps that follow are to be associated with the macro button 222. Alternatively, the macro button 222 and the programming button 228 may be pressed simultaneously. Then, the user may execute the steps of the macro and these are recorded by the operator. For example, the user may execute an open-the-door command with the command button 232 and turn on the light with the light button 230.

Once the programming of the macro has been completed, the user again presses the programming button 228. The pressing of the programming button 228 for the second time signifies that the programming of the macro is complete. Then, the macro associated with the pressing of the macro button 222 is stored in a memory of the operator. At a later time, when the macro button 222 is pressed, the macro is executed. In the preceding example, the user presses the button 222 and the door opens and the light is controlled.

In another example, a macro button 226 can have unique features. A macro button 226 may be associated with the unique feature that execution of the macro is dependent upon the state of the operator. In this example, the state may be the state of the barrier. If the macro is programmed when the barrier is in the open state, any macro learned to that button will only activate when the barrier is open. This makes a first operate command in the macro cause the barrier to move towards a closed position.

It will be understood that the wall control units shown in FIGS. 2a and 2b are only examples. For example, as shown in FIG. 1, the wall control unit may not contain programming buttons. The wall control unit may have only macro buttons, which are used both to program the macros into the system and execute the macros once the programming has occurred. In addition, a button on a transmitter may be used as the macro function button for initiation and/or programming of the macro. Other examples of wall and other types of control units and programming arrangements are possible.

Referring now to FIG. 3a, one example of an operator 302 is described. The operator comprises a receiver 320, controller 318, and memory 304. The receiver receives transmissions from a portable transmitter that are used to actuate the operator 302. The memory 304 may be any suitable memory structure that is used to store information. The memory 304 stores a table 306 (described below with respect to FIG. 3b) that represents one implementation example of a macro.

The controller 318 is coupled to a wall control unit (not shown) and receives signals from the wall control unit. The wall control unit is used to program macros that are stored in the table 306 in the memory 304. For example, the wall control unit may include a macro button. The macro button is pressed and held for a certain amount of time creating a signal that is sent to the controller 318. In response, the controller creates the table 306 (if the table 306 has not been created) or prepares the table 306 so that new entries can be added to the table 306. Operations are then performed and these are recorded by the controller 318. For instance, the user may press a light switch on the wall control unit to activate a light or may push a command button to open or close a door. In this example, the controller 318 then adds entries into the table 306 relating a macro name or identifier to the sequence of events associated with the macro. Thus, when more than one macro exists (as in this example), the macro name or identifier may be used as an index to access the correct macro in the table 306.

Referring now to FIG. 3b, one example of the table 306 that is used to define macros of function sequences is described. The table 306 includes columns 308 and 310. The column 308 includes a macro identifier, for example, macro identifiers M1, M2 or M3. The column 310 identifies functions, for example, functions F1, F2, and F3. The table 306 also includes three rows 312, 314, and 316. The rows 312, 314, and 316 each define a macro by relating a macro name or identifier to the functions or events comprising the macro. For instance, row 312 defines that macro M1 includes the performance of functions F1, F2, and F3. Row 314 defines that macro M2 includes the performance of functions F2 and F3. Row 316 defines that macro M3 includes the performance of functions F2 and F3. In one approach, the functions (e.g., F1, F2, F3) in the table may be codes that cause the controller 318 to perform the functions. In another example, the functions may be pointers to programming routines that perform the functions. The functions may be arranged in order of performance or other information may be included in the table that shows the order of performance. It will be appreciated that the table 306 is only one example of how functions may be associated with a macro. For example, other programming structures or combinations of programming structures may be used. In addition, the macro need not be represented as a table, but may be represented as hardware components or combinations of hardware and software components.

Figure 4A:
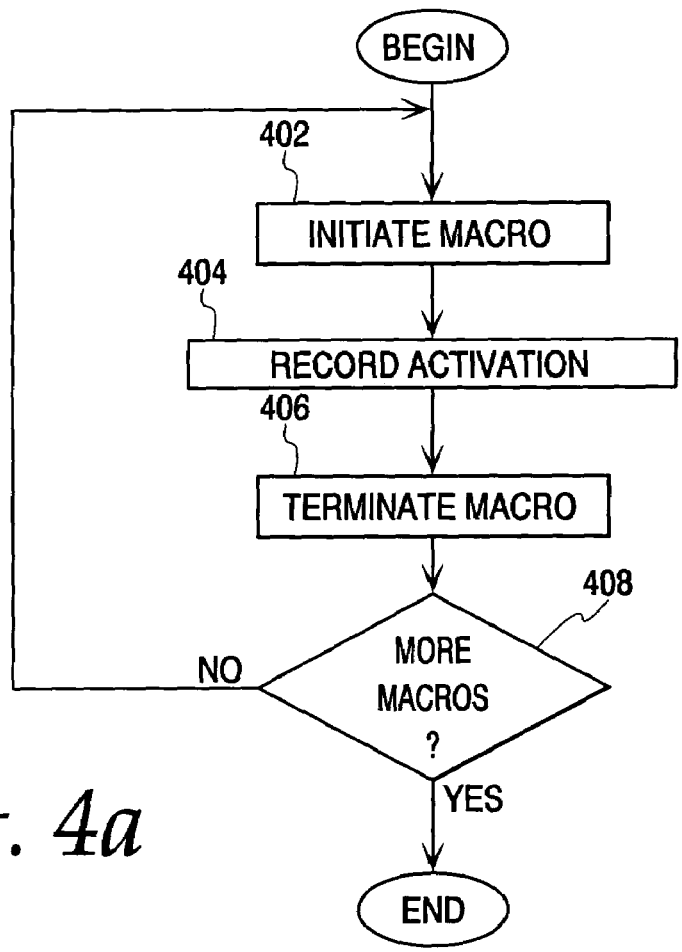
FIG. 4a is a flow chart of the operation of programming macros into a moveable barrier operator according to the present invention.

Referring now to FIG. 4a, one example of an approach for programming a macro is described. In one example, this programming can include creating and populating a table (such as the table of FIG. 3b). At step 402, a user initiates the programming of a macro. For example, a user at a wall control unit may press a macro button, initiate programming button, or programming button to signal to the operator that the user desires to program the macro. At step 404, the events and/or actions that comprise the macro are recorded. For instance, the user may perform various functions in a certain order such as turning on the light, opening the door, closing the door, and waiting for a delay time. These events and/or actions are recorded by the operator and associated with the macro. As mentioned, in one approach, the association may include representing the macro as a table such as that described above with respect to FIG. 3b.

At step 406, the macro programming is terminated. This may be accomplished in a variety of ways, for instance, by the user pressing the macro button again, pressing a dedicated terminate programming button, or pressing the programming button again. At step 408, it is determined if any more macros are to be programmed. If the answer is negative, execution ends and if the answer is affirmative execution returns to step 402 as described above where more macros can be programmed.

Figure 4B:
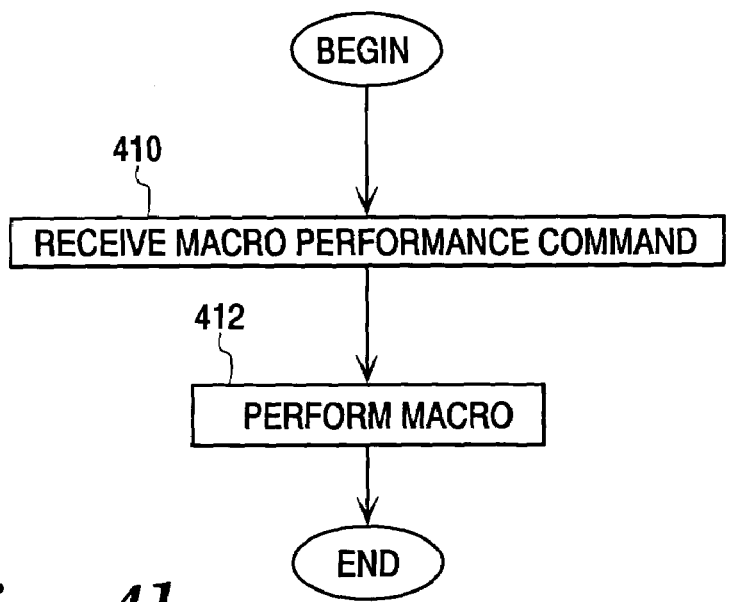
FIG. 4b is a flow chart for executing macros that are stored in a memory at a moveable barrier operator according to the present invention.

Referring now to FIG. 4b, one example of an approach for an operator to execute a macro is described. At step 410, the operator receives a command to execute the macro. This may be accomplished by the user pressing a button or combination of buttons that executes the macro. In one implementation, the pressing of the button creates a macro identifier, which is used as an index in other steps to locate a macro in a table (such as the table illustrated in FIG. 3b). At step 412, the operator performs the functions associated with the macro. For example, if a table similar to that of FIG. 3b is used to define the macro, a lookup may be performed using the macro name or identifier (created at step 410) as an index. Specifically, the index may be used to locate the appropriate macro (associated with a row) in the table. Once the macro is located in the table, the functions related to the macro are obtained and may be performed by the system. Other approaches not utilizing tables may also be used.

Thus, approaches are provided that create and execute function macros at a moveable barrier operator. The approaches described herein are efficient and simple to execute since users do not have to manually input and execute each function they wish to perform. In addition, the functions performed can be tailored to fit the needs of users.

While there has been illustrated and described particular embodiments of the present invention, it will be appreciated that numerous changes and modifications will occur to those skilled in the art, and it is intended in the appended claims to cover all those changes and modifications which fall within the true scope of the present invention.

What is claimed is:

1. A method of operating a moveable barrier operator comprising:
   initiating a recording of a macro;
   selecting a first of a plurality of actions performable by the moveable barrier operator and associating the first action with the macro;
   selecting at least a second of the plurality of actions available at the moveable barrier operator and associating the second action with the macro;
   recording a functional sequence of the first and second actions, the functional sequence specifying the order of performance of the first and second actions and associating the functional sequence with the macro;
   terminating the recording of the macro; and
   subsequent to the terminating, performing actions recorded by the macro at the moveable barrier operator in accordance with the functional sequence.

2. The method of claim 1 wherein performing the actions is dependent upon the state of the operator.

3. The method of claim 1 wherein selecting the first and second of the plurality of actions comprises selecting actions from a group comprising: a command that actuates a moveable barrier; a delay time; a light activation control command; and a mode change.

4. The method of claim 1 wherein selecting the first action comprises selecting at least one delay time and selecting the at least one second action comprises selecting a barrier operational command to operate a moveable barrier.

5. The method of claim 1 wherein selecting the first action comprises selecting at least one delay time and selecting the at least one second action comprises selecting a barrier operational command to operate a moveable barrier and at least one mode change indication.

6. The method of claim 5 wherein selecting the at least one mode change indication comprises selecting a vacation mode toggle indication.

7. The method of claim 1 wherein selecting the first action comprises selecting at least one delay time and selecting the at least second action comprises selecting a barrier operational command to operate a moveable barrier and a sensor reading.

8. The method of claim 7 wherein selecting the sensor reading comprises selecting a detection of an object as the object approaches a sensor positioned near the barrier.

9. The method of claim 1 further comprising recording a present state of the operator and returning the operator to the state whenever the macro is executed.

10. A moveable barrier operator system comprising:
    a moveable barrier;
    a selection mechanism for selecting a sequence of functions; and
    a moveable barrier operator coupled to the moveable barrier and the selection mechanism, the operator obtaining a sequence of user-selected functions from the selection mechanism and being programmed to associate the sequence of functions with a macro, the operator programmed to actuate the moveable barrier when the macro is selected by the user.

11. The system of claim 10 wherein the macro is dependent upon the state of the operator.

12. The system of claim 10 wherein the selection mechanism comprises a wall control unit.

13. The system of claim 10 wherein the system includes a light, the light being coupled to the operator.

14. The system of claim 10 wherein the system includes a motion sensor coupled to the operator.

15. The system of claim 10 wherein each of the sequence of functions is selected from a group comprising: a delay command that suspends operation of the operator for a delay time; a command that actuates the barrier; a command that actuates a light; a command that initiates the monitoring of a vehicle sensor; and a command that initiates the monitoring of a sensor for detection of an object.

16. The system of claim 10 wherein the moveable barrier is selected from a group comprising: a garage door, a sliding gate, a swinging gate, and a swinging door.

17. A method of programming a function macro at a moveable barrier operator comprising:
    selecting a sequence of functions to actuate a moveable barrier operator;
    associating the sequence of functions with a macro; and
    subsequently performing the macro to actuate the barrier operator in response the macro being selected by a user.

18. The method of claim 17 wherein performing the macro is dependent upon the state of the operator.

19. The method of claim 17 further comprising actuating a first actuator to initiate the selecting of the sequence of functions and subsequently actuating a second actuator to terminate the selecting of the sequence of functions.

20. The method of claim 17 comprising actuating an actuator to initiate the selecting of the sequence of functions and subsequently actuating the actuator to terminate the selecting of the sequence of functions.

21. The method of claim 17 comprising determining the present state of the moveable barrier operator and wherein performing the sequence of functions further comprises performing the sequence of functions based at least in part upon the present state of the operator.

22. The method of claim 21 wherein the present state of the operator is selected from a group comprising: a barrier stopped state; a barrier open state; a barrier partially open state; a light-on state; a light-off state; an obstruction-detection state; an obstruction non-detection state; a person detected state; a person non-detection state; a known-radio-signal detection state; a known radio detection non-detection state; an unknown radio signal detection state; and a radio signal non-detection state.

23. The method of claim 17 wherein selecting the sequence of functions comprises selecting at least one function selected from a group comprising an execution of a delay time, an execution of a command, an activation of a light toggle switch, an activation of a vacation mode toggle switch, and an activation of a motion detector.

24. A moveable barrier operator comprising:
a selection mechanism being responsive to user input to select a sequence of functions to be performed at the moveable barrier operator, the functions defining operations associated with the moveable barrier operator;
a memory; and
a controller coupled to the selection mechanism and the memory, the controller obtaining the sequence of functions and associating the sequence of functions with a macro.

25. The operator of claim 24 wherein an activation of the sequence is dependent upon a state of the operator.

26. The operator of claim 24 wherein the selection mechanism comprises a first actuator for initiating the selection of the sequence of functions and a second actuator for terminating the selection of the sequence of functions.

27. The operator of claim 24 wherein the selection mechanism comprises an actuator for initiating and terminating the selection of the sequence of functions.

28. The operator of claim 24 comprising an actuator for initiating the performance of sequence of functions associated with the macro.

29. The operator of claim 24 wherein each function of the sequence of functions is selected from a group comprising an execution of a delay time, an execution of a command, an actuation of a light switch, an actuation of a vacation mode switch, and an activation of a motion detector.

30. The operator of claim 24 wherein the controller is programmed to receive a present state of the moveable barrier operator.

31. The operator of claim 24 wherein the controller is programmed to perform the functions associated with the macro based at least in part upon the present state of the operator.

32. The operator of claim 31 wherein the present state of the operator is selected from a group comprising: a barrier stopped state; a barrier open state; a barrier partially open state; a light-on state; a light-off state; an obstruction-detection state; an obstruction non-detection state; a person detected state; a person non-detection state; a known-radio-signal detection state; a known radio detection non-detection state; an unknown radio signal detection state; and a radio signal non-detection state.

33. The operator of claim 24 further comprising means to load and store a pre-programmed macro comprising a sequence of preprogrammed functions into the memory from an outside programming source.

* * * * *